United States Patent
Chang et al.

(10) Patent No.: US 8,595,717 B2
(45) Date of Patent: *Nov. 26, 2013

(54) MEMORY CONTROLLER THAT INCLUDES SUPPORT FOR AUTORUN OF SOFTWARE OR DATA

(75) Inventors: William Ho Chang, Vancouver, WA (US); Vinaynathan Viswanathan, Pune (IN)

(73) Assignee: Flexiworld Technologies, Inc., Vancouver, WA (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/891,594

(22) Filed: Sep. 27, 2010

(65) Prior Publication Data

US 2011/0138378 A1    Jun. 9, 2011

Related U.S. Application Data

(63) Continuation of application No. 10/823,513, filed on Apr. 12, 2004, now Pat. No. 7,805,720, and a continuation-in-part of application No. 10/734,481, filed on Dec. 12, 2003.

(60) Provisional application No. 60/462,080, filed on Apr. 11, 2003, provisional application No. 60/433,196, filed on Dec. 12, 2002.

(51) Int. Cl.
*G06F 9/44*    (2006.01)

(52) U.S. Cl.
USPC .................... 717/173; 717/174; 717/178

(58) Field of Classification Search
USPC .................................. 717/168–178
See application file for complete search history.

(56) References Cited

U.S. PATENT DOCUMENTS

| 5,166,809 A | 11/1992 | Surbrook |
| 5,220,674 A | 6/1993 | Morgan et al. |

(Continued)

FOREIGN PATENT DOCUMENTS

| EP | 0473987 | 3/1992 |
| EP | 1072976 A2 | 1/2001 |

(Continued)

OTHER PUBLICATIONS

Jebarajan et al., A Method for Designing an Operating System for Plug and Play Bootstrap Loader USB Drive; IJCSI International Journal of Computer Science Issues, vol. 8, Issue 1, Jan. 2011; pp. 295-301.*

(Continued)

*Primary Examiner* — Wei Zhen
*Assistant Examiner* — Satish Rampuria
(74) *Attorney, Agent, or Firm* — Kolisch Hartwell, PC

(57) ABSTRACT

An integrated circuit microcontroller supporting Autorun of software or data is disclosed. The integrated circuit microcontroller can be included in a memory device, the memory device may be a USB dongle, a SD card, a flash drive, a wireless dongle or others that are connectable by a user to a computing device for running application or data stored in the memory device. The memory device may include a private memory component storing private or security data. The private or security data may be associated with computing or application software running or providing services on the computing device. The private or security data may protect the usage of or the services provided by the computing or application software. The computing device may include mobile phones, tablets, digital cameras, laptops, desktops, appliances etc. Exemplary services may include Internet access, wireless connectivity, phone calling, content access or content sharing.

23 Claims, 7 Drawing Sheets

(56) References Cited

U.S. PATENT DOCUMENTS

| | | | |
|---|---|---|---|
| 5,287,194 A | 2/1994 | Lobiondo |
| 5,337,258 A | 8/1994 | Dennis |
| 5,404,433 A | 4/1995 | Hosogai |
| 5,412,798 A | 5/1995 | Garney |
| 5,519,641 A | 5/1996 | Beers et al. |
| 5,564,109 A | 10/1996 | Snyder et al. |
| 5,580,177 A | 12/1996 | Gase et al. |
| 5,596,697 A | 1/1997 | Foster et al. |
| 5,604,843 A | 2/1997 | Shaw et al. |
| 5,613,123 A | 3/1997 | Tsang et al. |
| 5,619,649 A | 4/1997 | Kovnat et al. |
| 5,699,495 A | 12/1997 | Snipp |
| 5,761,480 A | 6/1998 | Fukada et al. |
| 5,832,191 A | 11/1998 | Thorne |
| 5,867,633 A | 2/1999 | Taylor et al. |
| 5,911,044 A | 6/1999 | Lo et al. |
| 5,933,498 A | 8/1999 | Schneck et al. |
| 5,940,843 A | 8/1999 | Zucknovich et al. |
| 5,982,520 A | 11/1999 | Weiser et al. |
| 5,987,454 A | 11/1999 | Hobbs |
| 6,009,464 A | 12/1999 | Hamilton et al. |
| 6,020,973 A | 2/2000 | Levine et al. |
| 6,043,898 A | 3/2000 | Jacobs |
| 6,044,428 A | 3/2000 | Rayabhari |
| 6,046,820 A | 4/2000 | Konishi |
| 6,070,185 A | 5/2000 | Anupam et al. |
| 6,119,153 A | 9/2000 | Dujari et al. |
| 6,138,178 A | 10/2000 | Watanabe |
| 6,141,659 A | 10/2000 | Barker et al. |
| 6,148,346 A | 11/2000 | Hanson |
| 6,167,514 A | 12/2000 | Matsui et al. |
| 6,202,023 B1 | 3/2001 | Hancock et al. |
| 6,216,183 B1 | 4/2001 | Rawlins |
| 6,225,993 B1 | 5/2001 | Lindblad et al. |
| 6,233,611 B1 | 5/2001 | Ludtke et al. |
| 6,246,486 B1 | 6/2001 | Takahashi |
| 6,256,666 B1 | 7/2001 | Singhal |
| 6,263,387 B1 | 7/2001 | Chrabaszcz |
| 6,279,153 B1 | 8/2001 | Bi et al. |
| 6,282,710 B1 | 8/2001 | Boehler |
| 6,285,889 B1 | 9/2001 | Nykanen et al. |
| 6,288,790 B1 | 9/2001 | Yellepeddy et al. |
| 6,324,521 B1 | 11/2001 | Shiota et al. |
| 6,330,611 B1 | 12/2001 | Itoh et al. |
| 6,353,928 B1 * | 3/2002 | Altberg et al. ............... 717/175 |
| 6,363,452 B1 | 3/2002 | Lach |
| 6,366,912 B1 | 4/2002 | Wallent et al. |
| 6,366,965 B1 | 4/2002 | Binford et al. |
| 6,366,966 B1 | 4/2002 | Laney et al. |
| 6,370,686 B1 * | 4/2002 | Delo et al. ................... 717/174 |
| 6,379,058 B1 | 4/2002 | Petteruti et al. |
| 6,389,010 B1 | 5/2002 | Kubler et al. |
| 6,389,159 B2 | 5/2002 | Gilman et al. |
| 6,405,362 B1 | 6/2002 | Shih et al. |
| 6,418,439 B1 | 7/2002 | Papierniak et al. |
| 6,418,554 B1 * | 7/2002 | Delo et al. ................... 717/174 |
| 6,421,748 B1 | 7/2002 | Lin et al. |
| 6,434,535 B1 | 8/2002 | Kupka et al. |
| 6,449,052 B1 | 9/2002 | Sherer et al. |
| 6,452,692 B1 | 9/2002 | Yacoub |
| 6,453,127 B2 | 9/2002 | Wood et al. |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,487,587 B1 | 11/2002 | Dubey |
| 6,487,599 B1 | 11/2002 | Smith et al. |
| 6,493,104 B1 | 12/2002 | Cromer et al. |
| 6,529,522 B1 | 3/2003 | Ito et al. |
| 6,546,387 B1 | 4/2003 | Triggs |
| 6,546,419 B1 | 4/2003 | Humpleman et al. |
| 6,553,431 B1 | 4/2003 | Yamamoto et al. |
| 6,556,313 B1 | 4/2003 | Chang et al. |
| 6,584,903 B2 | 7/2003 | Jacobs |
| 6,594,723 B1 | 7/2003 | Chapman et al. |
| 6,600,569 B1 | 7/2003 | Osada et al. |
| 6,603,744 B2 | 8/2003 | Mizutani et al. |
| 6,604,135 B1 | 8/2003 | Rogers et al. |
| 6,607,314 B1 | 8/2003 | McCannon et al. |
| 6,608,928 B1 | 8/2003 | Queiroz |
| 6,611,812 B2 | 8/2003 | Hurtado et al. |
| 6,623,527 B1 | 9/2003 | Hamzy |
| 6,625,472 B1 | 9/2003 | Farazmandnia et al. |
| 6,628,417 B1 | 9/2003 | Naito et al. |
| 6,633,395 B1 | 10/2003 | Tuchitoi et al. |
| 6,654,135 B2 | 11/2003 | Mitan |
| 6,658,625 B1 | 12/2003 | Allen |
| 6,671,068 B1 | 12/2003 | Chang et al. |
| 6,678,751 B1 | 1/2004 | Hays et al. |
| 6,694,371 B1 | 2/2004 | Sanai |
| 6,697,848 B2 | 2/2004 | Hamilton et al. |
| 6,701,009 B1 | 3/2004 | Makoto et al. |
| 6,705,781 B2 | 3/2004 | Iwazaki |
| 6,735,766 B1 * | 5/2004 | Chamberlain et al. ........ 717/173 |
| 6,735,768 B1 | 5/2004 | Tanaka |
| 6,745,229 B1 | 6/2004 | Gobin et al. |
| 6,745,255 B2 | 6/2004 | Yen et al. |
| 6,751,732 B2 | 6/2004 | Strobel et al. |
| 6,753,978 B1 | 6/2004 | Chang |
| 6,757,070 B1 | 6/2004 | Lin et al. |
| 6,757,783 B2 | 6/2004 | Koh |
| 6,760,745 B1 | 7/2004 | Tan et al. |
| 6,772,233 B2 | 8/2004 | Iida et al. |
| 6,785,727 B1 | 8/2004 | Yamazaki |
| 6,788,428 B1 | 9/2004 | Shimokawa |
| 6,798,530 B1 | 9/2004 | Buckley et al. |
| 6,826,632 B1 | 11/2004 | Wugofski |
| 6,829,672 B1 | 12/2004 | Deng et al. |
| 6,840,441 B2 | 1/2005 | Monaghan et al. |
| 6,857,716 B1 | 2/2005 | Nagahashi |
| 6,859,228 B1 | 2/2005 | Chang et al. |
| 6,885,362 B2 | 4/2005 | Suomela |
| 6,889,058 B2 | 5/2005 | Tordera |
| 6,898,652 B2 | 5/2005 | Peters et al. |
| 6,941,014 B2 | 9/2005 | Lin et al. |
| 6,944,687 B2 | 9/2005 | Doragh et al. |
| 6,947,995 B2 | 9/2005 | Chang et al. |
| 6,948,165 B1 | 9/2005 | Luu et al. |
| 6,975,644 B2 | 12/2005 | Tordera et al. |
| 7,050,840 B2 | 5/2006 | Lin et al. |
| 7,055,956 B2 | 6/2006 | Olson et al. |
| 7,099,304 B2 | 8/2006 | Liu et al. |
| 7,102,691 B2 | 9/2006 | Dischert et al. |
| 7,127,541 B2 | 10/2006 | Govindarajulu et al. |
| 7,136,914 B2 | 11/2006 | Motoyama |
| 7,143,408 B2 * | 11/2006 | Anderson et al. ............. 717/175 |
| 7,149,834 B2 | 12/2006 | Peters et al. |
| 7,174,535 B2 | 2/2007 | Wragge |
| 7,237,046 B2 | 6/2007 | Paley et al. |
| 7,243,153 B2 | 7/2007 | McIntyre et al. |
| 7,318,086 B2 | 1/2008 | Chang et al. |
| 7,353,416 B2 | 4/2008 | Jeansonne et al. |
| 7,370,090 B2 | 5/2008 | Nakaoka et al. |
| 7,609,402 B2 | 10/2009 | Chang et al. |
| RE41,416 E | 7/2010 | Liu et al. |
| RE41,487 E | 8/2010 | Liu et al. |
| RE41,532 E | 8/2010 | Liu et al. |
| RE41,689 E | 9/2010 | Liu et al. |
| 7,805,720 B2 | 9/2010 | Chang et al. |
| RE41,882 E | 10/2010 | Liu et al. |
| 7,908,401 B2 | 3/2011 | Chang |
| 7,941,541 B2 | 5/2011 | Chang et al. |
| 7,944,577 B2 | 5/2011 | Chang et al. |
| 7,953,818 B2 | 5/2011 | Chang et al. |
| RE42,725 E | 9/2011 | Chang et al. |
| RE42,828 E | 10/2011 | Liu et al. |
| RE43,181 E | 2/2012 | Liu et al. |
| 8,184,324 B2 | 5/2012 | Chang et al. |
| 8,285,802 B2 | 10/2012 | Chang et al. |
| 8,296,757 B2 | 10/2012 | Chang et al. |
| 8,332,521 B2 | 12/2012 | Chang |
| 8,533,352 B2 | 9/2013 | Chang |
| 2001/0029531 A1 | 10/2001 | Ohta |
| 2001/0032254 A1 | 10/2001 | Hawkins |
| 2002/0012329 A1 | 1/2002 | Atkinson |

(56) References Cited

U.S. PATENT DOCUMENTS

| | | |
|---|---|---|
| 2002/0026492 A1 | 2/2002 | Fujita |
| 2002/0032855 A1 | 3/2002 | Neves et al. |
| 2002/0065098 A1 | 5/2002 | Hosogaya |
| 2002/0065872 A1 | 5/2002 | Genske |
| 2002/0078367 A1 | 6/2002 | Lang |
| 2002/0081993 A1 | 6/2002 | Toyoshima |
| 2002/0083151 A1 | 6/2002 | Adams |
| 2002/0083430 A1 | 6/2002 | Kusuda |
| 2002/0097408 A1 | 7/2002 | Chang |
| 2002/0097415 A1 | 7/2002 | Chang |
| 2002/0097416 A1 | 7/2002 | Chang |
| 2002/0097417 A1 | 7/2002 | Chang |
| 2002/0097418 A1 | 7/2002 | Chang |
| 2002/0097419 A1 | 7/2002 | Chang |
| 2002/0097433 A1 | 7/2002 | Chang |
| 2002/0101515 A1 | 8/2002 | Yoshida |
| 2002/0108054 A1 | 8/2002 | Moore et al. |
| 2002/0145632 A1 | 10/2002 | Shmueli |
| 2003/0028797 A1 | 2/2003 | Long et al. |
| 2003/0046447 A1 | 3/2003 | Kouperchliak |
| 2003/0084256 A1 | 5/2003 | McKee |
| 2003/0087601 A1 | 5/2003 | Agam |
| 2003/0110371 A1 | 6/2003 | Yang |
| 2003/0112975 A1 | 6/2003 | Taiwanese |
| 2003/0120754 A1 | 6/2003 | Muto |
| 2003/0122934 A1 | 7/2003 | Shiohara |
| 2003/0160993 A1 | 8/2003 | Kang |
| 2003/0182456 A1 | 9/2003 | Lin et al. |
| 2003/0200372 A1 | 10/2003 | Doragh et al. |
| 2003/0225971 A1 | 12/2003 | Oishi |
| 2004/0006648 A9 | 1/2004 | Kita |
| 2004/0015709 A1 | 1/2004 | Chen |
| 2004/0057075 A1 | 3/2004 | Stewart |
| 2004/0070379 A1 | 4/2004 | Koretsky |
| 2004/0095382 A1 | 5/2004 | Fisher et al. |
| 2004/0177355 A1 | 9/2004 | Wragge |
| 2004/0203694 A1 | 10/2004 | Wong |
| 2005/0005149 A1 | 1/2005 | Hirota et al. |
| 2005/0005263 A1 | 1/2005 | Miyazaki |
| 2005/0246436 A1 | 11/2005 | Day et al. |
| 2006/0080517 A1 | 4/2006 | Brown |
| 2006/0173980 A1 | 8/2006 | Kobayashi |
| 2007/0081486 A1 | 4/2007 | Koide |
| 2007/0288611 A1 | 12/2007 | Serceki et al. |
| 2008/0003947 A1 | 1/2008 | Morris |
| 2008/0071935 A1 | 3/2008 | Ohta |
| 2008/0126628 A1 | 5/2008 | Mullis |
| 2009/0198839 A1 | 8/2009 | Banerjee |
| 2011/0016280 A1 | 1/2011 | Chang et al. |
| 2011/0138378 A1 | 6/2011 | Chang |
| 2011/0167166 A1 | 7/2011 | Chang |
| 2011/0167175 A1 | 7/2011 | Chang |

FOREIGN PATENT DOCUMENTS

| | | |
|---|---|---|
| WO | 9526703 | 10/1995 |
| WO | 0006904 | 2/2000 |
| WO | WO0241118 A2 | 5/2002 |
| WO | 03015641 | 2/2003 |
| WO | WO2004093149 A2 | 10/2004 |

OTHER PUBLICATIONS

Tahir et al., Analysis of AutoPlay Feature via the USB Flash Drives; Proceedings of the World Congress on Engineering 2008 vol. I; pp. 1-4.*

European Examination Report of European Application No. 04759486.6 dated Dec. 23, 2011, 11 pages total.

David, J., "Security in a Flash", Computers & Security, vol. 22, No. 1, Jan. 1, 2003, pp. 29-33, Elsevier Science Publishers, Amsterdam, Netherlands.

USPTO (Joshua JOO, authorized officer); "Office Action" for U.S. Appl. No. 10/734,481; mailing date Aug. 2, 2011; 68 pages.

Wiener et al. "Meeting USB and IEEE1394 overcurrent protection requirements using PolySwitch devices", IEEE Wescon/97 Conference Proceedings, Nov. 1997 pp. 442-475.

Remple, "USB on-the-go interface for portable devices", IEEE, Jun. 2003 pp. 8-9.

Jankovec et al., "Analog circuit development system", IEEE, Sep. 2003 pp. 125-129 vol. 1.

WIPO (Jason D. Cardone, authorized officer), "International Search Report" for PCT/US2003/039547; mailed Jul. 15, 2005; 4 pages.

WIPO (Thomas C Lee, authorized officer), "International Search Report" for PCT/US2004/011372; mailed Jun. 20, 2007; 3 pages.

WIPO (Ellen Moyse and Thomas C. Lee, authorized officers), "International Preliminary Examination Report and Written Opinion" for PCT/US2004/011372; mailed Aug. 14, 2007; 3 pages.

USPTO "Office Action" for U.S. Appl. No. 10/823,513; mailing date Feb. 8, 2007; 60 pages.

USPTO "Office Action" for U.S. Appl. No. 10/823,513; mailing date Oct. 31, 2007; 26 pages.

USPTO "Office Action" for U.S. Appl. No. 10/734,481; mailing date Mar. 24, 2008; 33 pages.

USPTO "Office Action" for U.S. Appl. No. 10/734,484; mailing date Sep. 2, 2008; 44 pages.

USPTO "Office Action" for U.S. Appl. No. 10/823,513; mailing date Dec. 29, 2008; 28 pages.

USPTO "Office Action" for U.S. Appl. No. 10/734,481; mailing date Jan. 6, 2009; 43 pages.

USPTO "Office Action" for U.S. Appl. No. 10/823,513; mailing date Dec. 17, 2009; 32 pages.

USPTO; "Notice of Allowance" for U.S. Appl. No. 10/823,513; mailing date Jun. 1, 2010; 43 pages.

USPTO; "Notice of Allowance" for U.S. Appl. No. 10/734,484; mailing date Oct. 28, 2011; 57 pages.

US Patent and Trademark Office, Notice of Allowance regarding U.S. Appl. No. 13/047,674, Nov. 6, 2012, 21 pages.

US Patent and Trademark Office, Office action regarding U.S. Appl. No. 13/047,672, Nov. 6, 2012, 33 pages.

US Patent and Trademark Office, Office action regarding U.S. Appl. No. 10/734,481, Nov. 7, 2012, 86 pages.

US Patent and Trademark Office, Office action regarding U.S. Appl. No. 13/103,958, Nov. 16, 2012, 41 pages.

Haynie, Dave, "The Zorro III Bus Specification: A General Purpose Expansion Bus for High Performance Amiga Computers," Mar. 20, 1991, Revision 1.0, pp. 1-84.

US Receiving Office, International Search Report regarding PCT Application No. PCT/US01/48057, Jan. 6, 2003, 1 page.

US Receiving Office, International Preliminary Examination Report regarding PCT Application No. PCT/US01/48057, Aug. 24, 2004, 11 pages.

Attiaoui et al., "Conception of Data Base Management System in USB Smart Card Flash Memory: Application for the Cancer Pathology of Medical Information Systems," SETIT 2005: 3rd International Conference: Sciences of Electronic Technologies of Information and Telecommunications, Mar. 27-31, 2005, pp. 1-7.

State Intellectual Property Office of the P.R.C. Office Action regarding Chinese Patent Application No. 200480016309.4, May 8, 2009, 10 pages.

European Patent Office, Office Action regarding European Patent Application No. 01985549.3, Oct. 26, 2010, 4 pages.

State Intellectual Property Office of the P.R.C. Office Action regarding Chinese Patent Application No. 200480016309.4, May 24, 2011, 11 pages.

State Intellectual Property Office of the P.R.C. Office Action regarding Chinese Patent Application No. 200480016309.4, Oct. 28, 2011, 6 pages.

European Patent Office, Office Action regarding European Patent Application No. 04759486.6, Dec. 23, 2011, 11 pages.

U.S. Patent and Trademark Office; Office Action for U.S. Appl. No. 10/823,513; Feb. 8, 2007; 15 pages.

USPTO Notice of Allowance for U.S. Appl. No. 12/890,847; Jun. 20, 2012; 10 pages.

(56) References Cited

OTHER PUBLICATIONS

USPTO Office Action for U.S. Appl. No. 10/734,848; Sep. 2, 2008; 31 pages.
USPTO Notice of Allowance for U.S. Appl. No. 10/734,848; Oct. 28, 2010; 20 pages.
U.S. Patent and Trademark Office; Ex Parte Quayle regarding U.S. Appl. No. 10/734,481; mailing date Dec. 8, 2009; 40 pages.
U.S. Patent and Trademark Office; Office Action regarding U.S. Appl. No. 13/047,674; mailing date Mar. 14, 2012; 38 pages.
U.S. Patent and Trademark Office; Office Action regarding U.S. Appl. No. 10/734,481; mailing date Apr. 4, 2012; 83 pages.
U.S. Patent and Trademark Office; Notice of Allowance for U.S. Appl. No. 13/047,674; mailing date Apr. 29, 2013; 15 pages.
U.S. Patent and Trademark Office; Office Action regarding U.S. Appl. No. 13/047,672; mailing date Aug. 1, 2013; 25 pages.
U.S. Patent and Trademark Office; Office Action regarding U.S. Appl. No. 10/734,481; mailing date Sep. 10, 2013; 28 pages.
US 8,396,977, 03/2013, Chang (withdrawn)

* cited by examiner

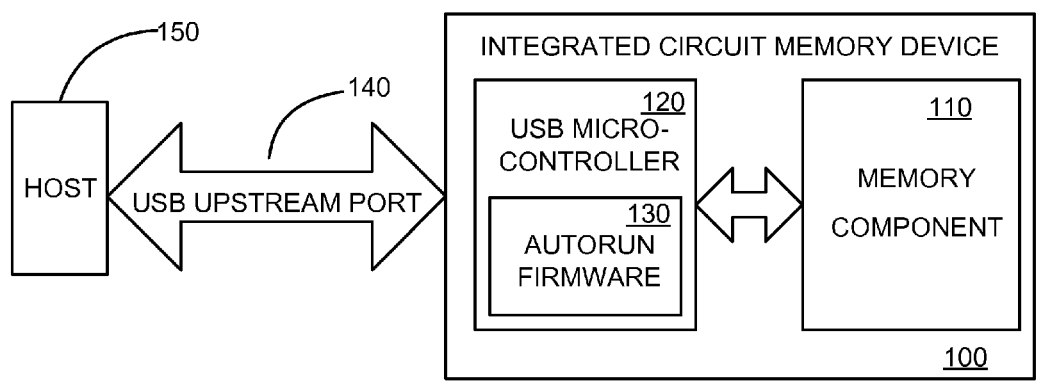
Fig. 1
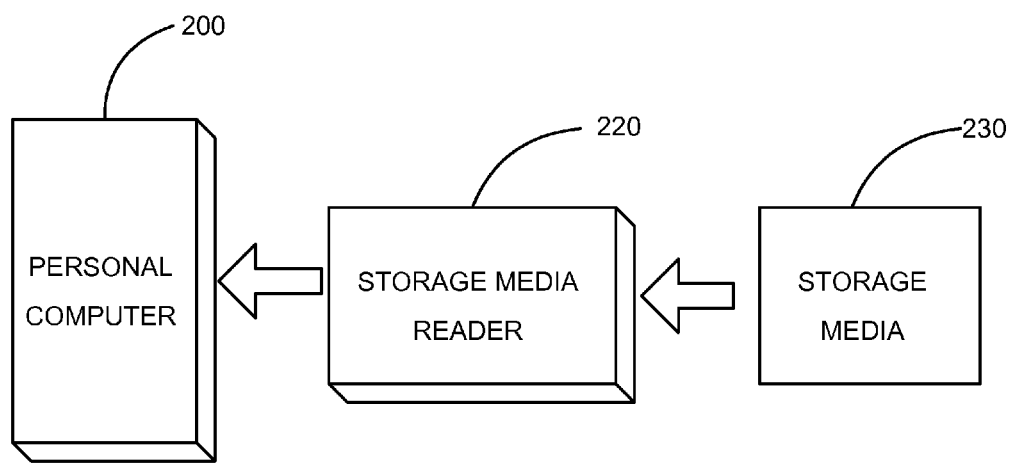
Fig. 2 – PRIOR ART

US 8,595,717 B2

MEMORY CONTROLLER THAT INCLUDES SUPPORT FOR AUTORUN OF SOFTWARE OR DATA

CROSS-REFERENCES TO RELATED APPLICATIONS

This application is a continuation of U.S. patent application Ser. No. 10/823,513, filed Apr. 12, 2004, which claims the benefit of U.S. Provisional Patent Application Ser. No. 60/462,080, filed Apr. 11, 2003, and a continuation-in-part of U.S. patent application Ser. No. 10/734,481, filed Dec. 12, 2003, which claims the benefit of U.S. Provisional Patent Application Ser. No. 60/433,196, filed Dec. 12, 2002, which are incorporated herein by reference in their entirety for all purposes.

TECHNICAL FIELD

This invention relates to a system and method for utilizing storage media such as flash memory for achieving autorun of an application executable or installer stored on the storage media.

BACKGROUND AND SUMMARY OF THE INVENTION

As is known in the art, some applications such as software installers may be run automatically upon insertion of a CD-ROM disc into a CD-ROM drive, which may sometimes be called a dock or reader. In operation, this automatic running of an application is provided by an autorun feature that is stored on or incorporated into CD-ROM drive dock/reader. Executables or installers stored on the CD-ROM disc are executed by the host personal computer based upon activation by the autorun feature in the CD-ROM drive dock/reader. In this implementation, the autorun feature is incorporated into the hardware drive/dock/reader, which is separate from the storage media.

Universal Serial Bus (USB) technology is rapidly gaining preference as the interfacing technology of choice for peripherals on computing devices such as personal or laptop computers. Flash memories coupled with a USB interface has become a convenient and portable storage device that can replaces floppy disks and compact disks (CDs).

However, the popular and widely-adopted Universal Serial Bus technology does not include distinct autorun features in the docks/readers. As a consequence, conventional integrated circuit memory devices such as USB memory devices do not have autorun functionality.

Accordingly, the present invention provides autorun functionality to any IC memory device, such as any USB peripheral, that has a memory component interfaced to a computing device interface microcontroller. The present invention provides autorun of one or more executables or application installers from a memory component with an interface to a computing device without an intermediate hardware-based autorun feature. As an example, such interface could be a USB interface and such computing device could be a personal computer.

For example, each USB peripheral device internally contains a USB microcontroller that performs the functionality associated with identifying the device to a host computing device, such as a personal computer. In accordance with the present invention, autorun firmware is embedded into the USB microcontroller. The autorun firmware enables autorun of an installable or executable application stored on the memory component of the USB device. The firmware acts as bridge component translating all commands and interactions between a host PC and the memory component.

Additional description and implementations of the present invention will be apparent from the detailed description of the preferred embodiment thereof, which proceeds with reference to the accompanying drawings.

BRIEF DESCRIPTIONS OF THE DRAWINGS

FIG. 1 illustrates an exemplary implementation of an autorun integrated circuit (IC) memory device according to the present invention.

FIG. 2 is a block diagram of a prior art arrangement in which a host personal computer includes an intermediate hardware dock that provides an autorun feature.

DETAILED DESCRIPTION OF PREFERRED EMBODIMENT

Figure 3:
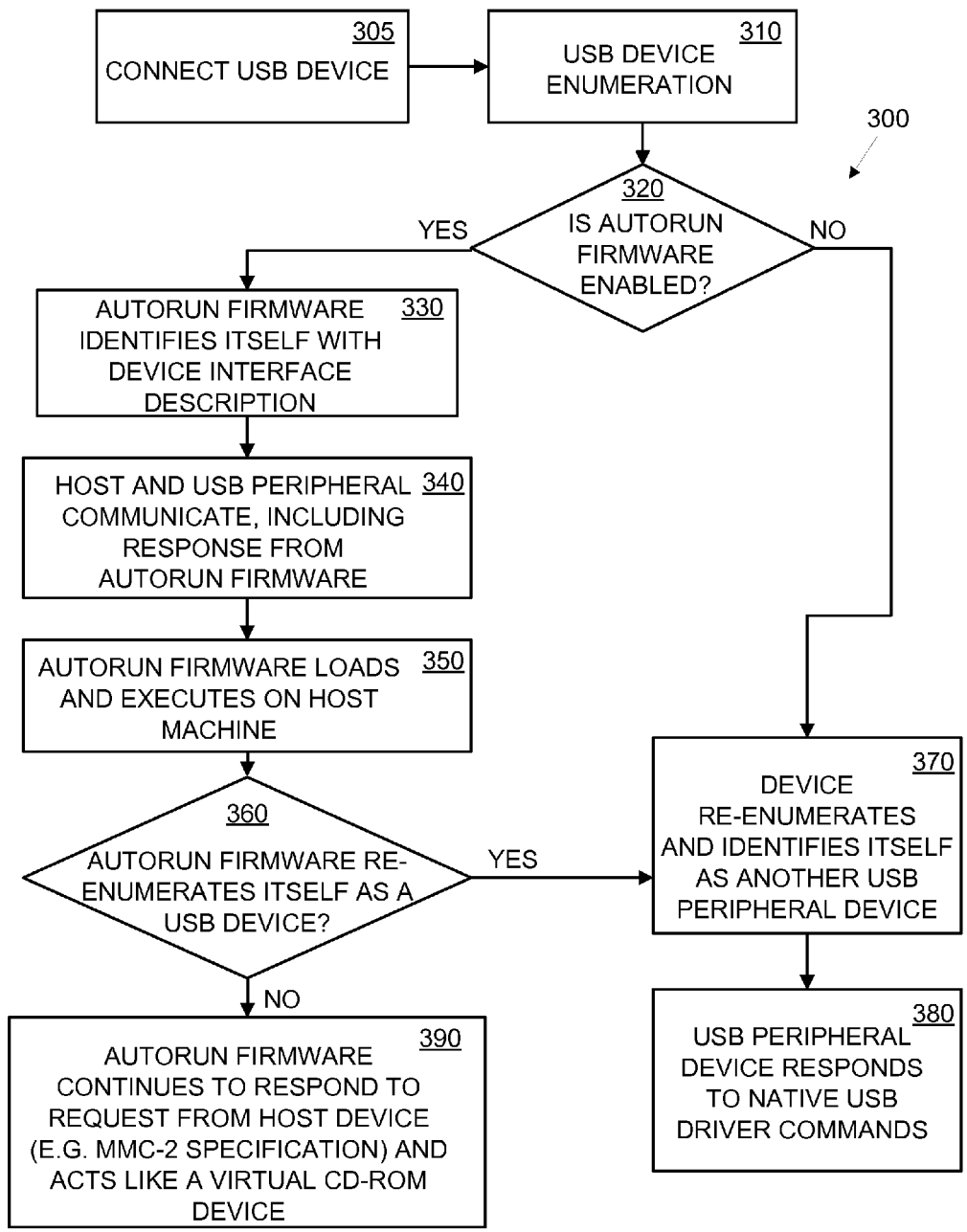
FIG. 3 is a flow diagram of an IC memory device autorun method.

FIG. 1 illustrates an exemplary implementation of an autorun integrated circuit (IC) memory device 100 according to the present invention. Autorun IC memory device may be in the form of a USB memory device, a compact flash card, a smart card, etc. For purposes of illustration, autorun IC memory device 100 will be described with reference to a universal serial bus (USB) memory device implementation.

Autorun IC memory device 100 includes a memory component 110 that communicates with a USB microcontroller 120 having autorun firmware 130 incorporated or embedded into microcontroller 120. Autorun IC memory device 100 includes an upstream port 140 for connecting to a host computing device 150 (e.g., personal or laptop computer, handheld computer, PDA, smart phone, etc., not shown). In the illustrated implementation, upstream port 140 is a USB port.

Autorun firmware 130 causes an application or executable stored in memory component 110 to be installed or run automatically upon activation of the IC memory device 100 vis-à-vis the host computing device 150. This activation may be achieved in a variety of ways including connecting or inserting the autorun IC memory device 100 into a docking system or port present on or interfaced to the host computing device 150. For example, IC memory device 100 with autorun firmware 130 incorporated into USB microcontroller 120 allows a "USB Flash Drive" storing one or more application executables or installables to be run automatically (i.e., autorun) upon activation, such as being plugged into the USB port of a host PC 150.

FIG. 2 is a block diagram of a prior art arrangement in which a host personal computer 200 includes an intermediate hardware dock 220 that provides an autorun feature for a storage medium like a CD-ROM 230. Intermediate hardware dock 220 functions as a storage media reader that may be internally integrated with or externally connected to the host personal computer 200 and the storage medium 230.

In this prior art implementation, insertion of a CD-ROM disc 230 into a CD-ROM dock/reader 220 may cause activation of an autorun feature that is stored on or incorporated into CD-ROM dock/reader 220. Executables or installers stored on the CD-ROM disc 230 may then be executed by the host personal computer 200 based upon activation by the autorun feature CD-ROM dock/reader 220.

As another example of such a prior art implementation, a flash memory card reader connected to a host computing device, such as a personal computer, may also include an autorun feature that can activate an executable or installer to run on the host computing device.

A disadvantage of such prior art implementations is that autorun features are incorporated into hardware docks or readers that are separate from the storage media. However, the popular and widely-adopted Universal Serial Bus technology does not include such distinct autorun features. As a consequence, conventional integrated circuit memory devices such as USB memory devices do not have autorun functionality. In contrast, the present invention provides autorun functionality to any IC memory device, such as any USB peripheral that has a memory component interfaced to a USB microcontroller.

FIG. 3 is a flow diagram of an IC memory device autorun method 300 that may be implemented from firmware 130 incorporated into a USB controller 120.

In step 305, a USB peripheral is inserted into or connected to a USB port of a host computing device (e.g., a personal computer).

In step 310, the host computing device performs an enumeration to identify the newly attached USB peripheral.

Step 320 is a query as to whether the USB peripheral includes autorun firmware that is enabled. If so, step 320 proceeds to step 330. If not, step 320 proceeds to step 370.

In step 330, the autorun firmware in the USB peripheral announces itself with a device interface description. For example, the device interface description may include Mass Storage Class, SCSI transparent command set, Bulk Only Transport corresponding to a CD-ROM, for example.

In step 340, the host and the USB peripheral communicate with each other using, for example a standard MMC-2 specification set. The communication includes a response to host commands from the autorun firmware according to the MMC-2 specification. As a part of the MMC-2 specification, the host requests enumeration of files in root directory and the autorun firmware responds to the request.

In step 350, the autorun firmware informs the host of the presence of an autorun executable file to be executed and provides the file to the host. For example, the file may be named "Autorun.inf," which may be stored on the memory component of the USB peripheral. The host executes the autorun executable file to provide the autorun functionality.

Step 360 is a query whether the autorun firmware is to be enumerated again or "re-enumerated." If so, step 360 proceeds to step 370. If not, step 360 proceeds to step 390. Re-enumeration allows the autorun firmware to announce itself to the host as one or more other USB peripherals (e.g. data storage device, communication adapter, etc.) or, if there is no re-enumeration, the autorun firmware can continue to function as per MMC-2 specifications.

In step 370, the autorun firmware re-enumerates or identifies itself as another USB device, such as a USB flash drive or a USB wireless (e.g., Bluetooth, WiFi, IrDA) device or "dangle." With such a re-enumeration, the autorun firmware identifies itself with device interface descriptors for the other USB devices (e.g., USB flash drive or USB Bluetooth dongle).

In step 380, the autorun firmware loads the firmware associated with the enumerated USB peripheral (e.g., USB flash drive or USB Bluetooth dongle).

In step 390, the autorun firmware is configured to not re-enumerate itself and continues to act as a virtual CD-ROM type device implementing the MMC-2 specifications.

Process steps 320, 330, 340, 350 and 360 correspond to the autorun firmware implementation. Step 390 provides for the implementation of a virtual mass storage device from a memory component that implements SCSI command set and MMC-2 specifications.

Figure 4A:
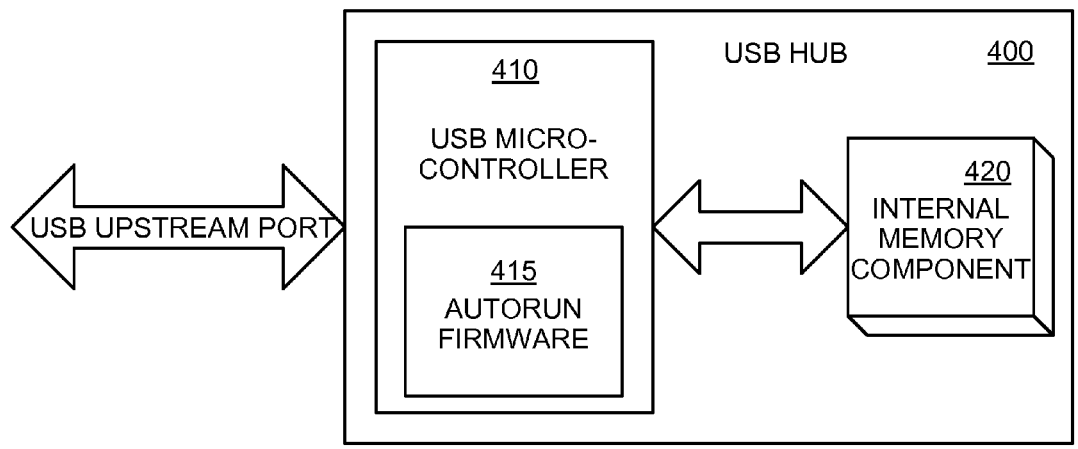
FIGS. 4A and 4B illustrate autorun firmware according to the present invention be embedded into alternative USB device configurations.
Figure 4B:
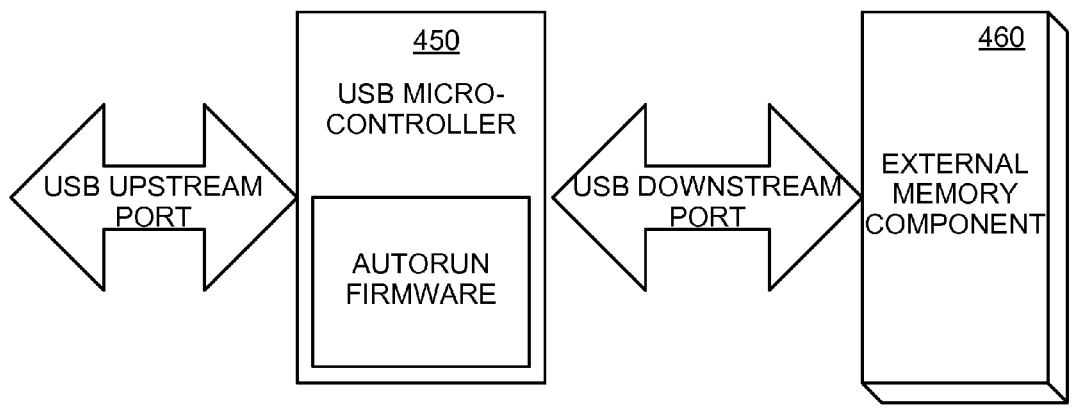

Autorun firmware according to the present invention can be embedded into multiple USB device configurations to provide a variety of unique USB peripherals with autorun functionality and into other peripheral devices with similar functionality. For example, FIG. 4A shows a USB hub 400 in which a USB microcontroller 410 with auto run firmware 415 communicates with an internal memory component 420. In FIG. 4B, a USB microcontroller 450 is connected to an external memory component 460 through a USB downstream port 470.

With reference to FIG. 4A, the USB microcontroller 410 that forms a part of the USB hub 400 typically is a repeater type entity allowing for cascaded multiple USB peripherals to connect through a single upstream port to a host system. The USB microcontroller 410 includes support for programming capability, which includes the autorun firmware 415. The Autorun firmware can then be ported to work on the USB microcontroller 410. The firmware may be stored on the internal memory component 420. Alternatively, the Autorun firmware may be stored on external memory that is in an attached USB memory component 430.

Figure 5:
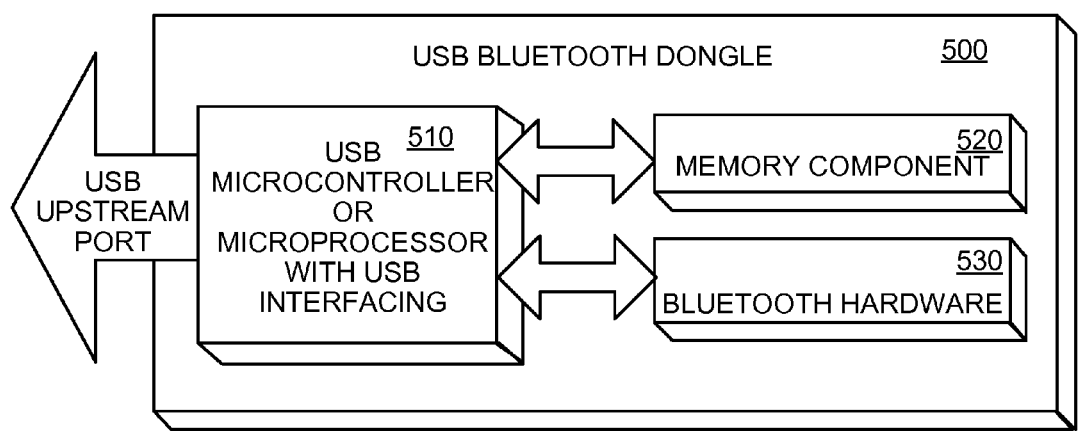
FIG. 5 is a block diagram of a USB peripheral having multiple functionalities.

As another configuration, FIG. 5 is a block diagram of a USB peripheral 500 having multiple functionalities. In this implementation, USB peripheral 500 includes an internal microprocessor with USB interfacing 510, or alternatively a USB microcontroller, that communicates with a memory component 520 and wireless (e.g., Bluetooth) networking hardware 530. As a result, USB peripheral 500 is capable of operating as a wireless (e.g., Bluetooth) networking device or "dongle" and as USB flash drive, both of which are accessible with autorun functionality In one configuration, the microprocessor 510 has USB interfacing ability. It is coupled with a memory component 520 and Bluetooth radio component 530. Microprocessor 510 implements client layers of the Bluetooth stack. The firmware that the microprocessor 510 executes is stored in memory component 520. The autorun firmware can also be additionally stored as a part of the functionality of existing firmware or separately in the memory component 520. In another configuration, the microprocessor 510 may not directly have USB interfacing capability and could use a separate USB microcontroller (not shown).

A feature of including autorun firmware in USB peripherals is that software applications can be bundled with the USB peripherals. The bundled software application may or may not utilize the USB peripheral.

Figure 6:
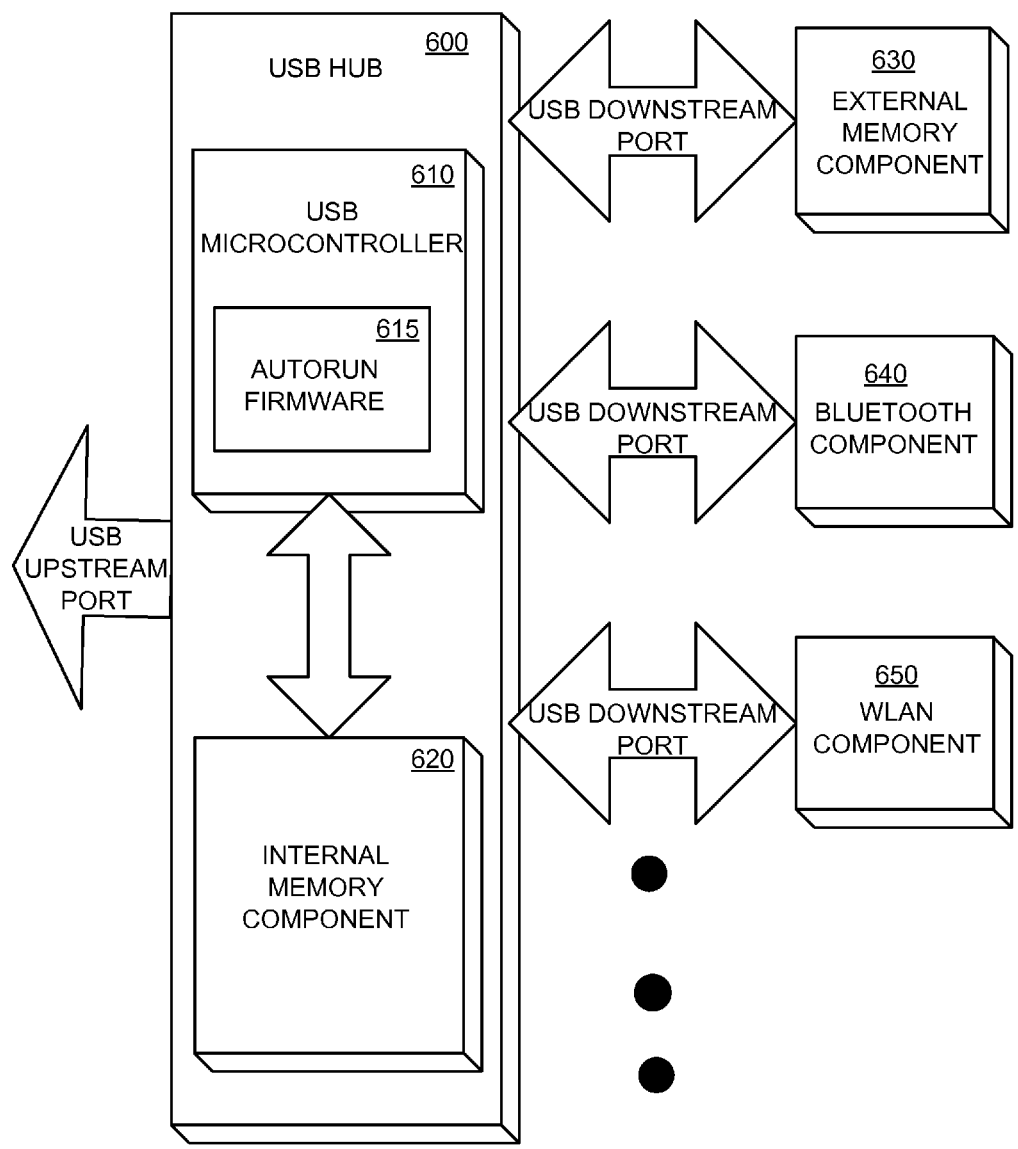
FIG. 6 is a block diagram of a USB hub with autorun firmware and access to multiple distinct functionalities.

As an example, FIG. 6 is a block diagram of a USB hub 600 that includes a USB microcontroller 610 with autorun firmware 615 and access to one or multiple distinct functionalities or USB peripherals, such as an external memory component 630, a Bluetooth networking component 640, or a WLAN component 650. Such USB peripherals 630-650 could be formed in combination with USB hub 600. USB hub 600 may be externally connected with one or more of these components 630-650, as illustrated, or alternatively one or more of the components 630-650 can be internally integrated to form a USB peripheral or device with multiple distinct functionalities.

There could be multiple executions of autorun firmware from each or some of these peripherals. Thus the autorun firmware allows for distribution of software (e.g. device drivers, synchronization software, etc.) that can be autorun along with any USB peripheral.

The implementation options also include mechanisms for allowing the autorun feature to be enabled or disabled by an external mechanism (e.g., switch) that is included on the device or peripheral. The switch could be manually operable by a person. The switch could be a simple two-mode (e.g., autorun on/off) switch or could be a switch that selects from among more than two modes.

Figure 7:
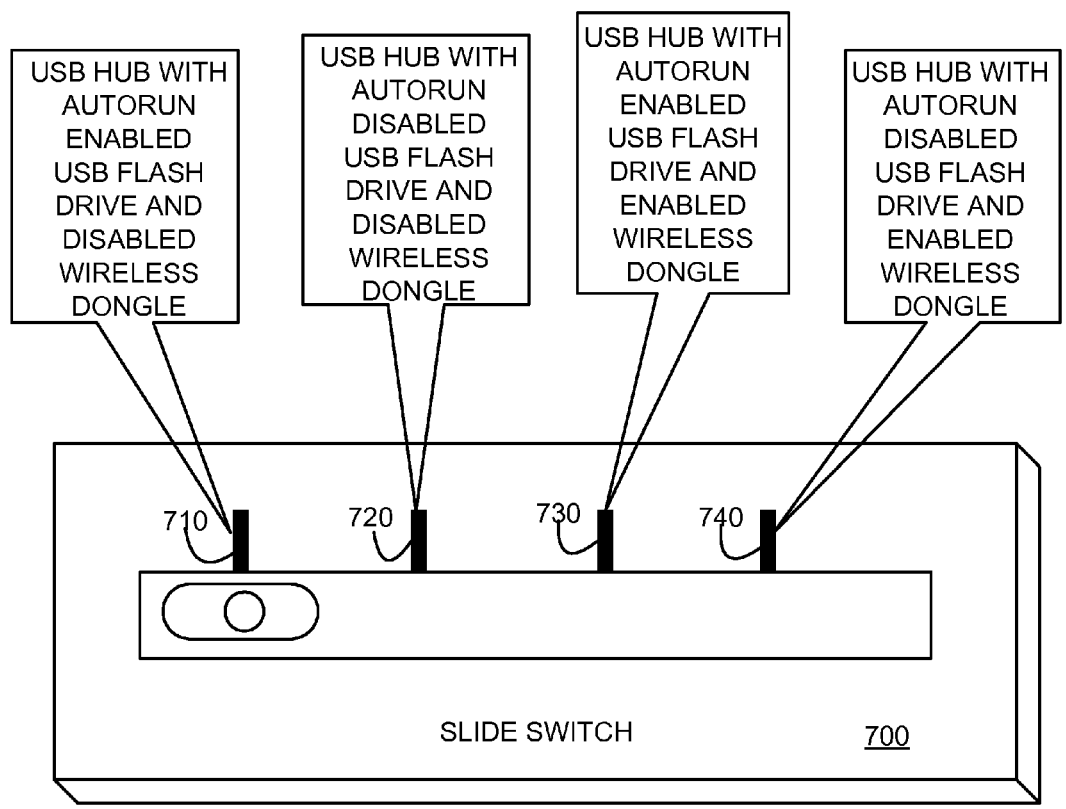
FIG. 7 is a schematic diagram of a person-operable physical slide switch.

FIG. 7 is a schematic diagram of a person-operable physical slide switch 700 that allows a person to select from among multiple modes, functionalities, or peripherals available on a USB device or "dongle." As an example, switch 700 relates to features or peripherals available from USB hub 600 of FIG. 6, including external memory component 630, and wireless dongle or module (640 or 650) for adding wireless (e.g. Bluetooth, WiFi, IrDA) interface to its host PC.

In this exemplary illustration, switch 700 has 4 user-selectable positions. In position 710, autorun functionality is enabled, the wireless component is disabled. In position 720, autorun functionality is disabled, wireless component is disabled. In position 730, autorun functionality is enabled, wireless component is enabled. In position 740, autorun functionality is disabled, wireless component is enabled.

The autorun firmware enables the distribution of software that can be autorun from a memory component. There is also a unique security mechanism that can be incorporated to protect the software that is installable or executable from the memory component by the autorun firmware.

A section of the internal memory component (e.g., memory component 620, FIG. 6) may be protected from public access by password protecting it or by physical security means such as a lock, among other means. The flash memory component can also be segmented into public and private sections. Private sections can be used to store installable or executables that cannot be viewed or accessed by the user, and public sections can be viewed or accessed by users in a conventional manner. The installable or executable software being distributed through the memory component can be stored in the protected region of the memory component. Security by way of copy protection of this installable software can be achieved by allowing only an application launcher executable, which is autorun from the memory component, to access the installable software.

In one implementation, the application launcher executable has the following characteristics: it is autorun from memory component, and it has access to the protected or private region of memory component. This access is gained by authenticating itself to the memory controller (e.g. USB microcontroller) and/or to the installable software in the protected region of the memory component. The authentication mechanism may be a password-based mechanism or a more involved cryptographic algorithm. Among the various techniques used for authentication are digital signatures and unique identifiers like the Bluetooth Device Address, MAC address, etc. The application launcher executable may authenticate itself directly to the memory controller software and/or installable software or to a separate authentication software that resides in the protected region of the memory component.

The application launcher executable may be built generically to execute any or all executables and installables that exist within the protected region of the memory component. Alternatively, the application launcher executable may be programmed to launch a particular executable or installable from the protected region. Considering the possibility of the memory component being segmented into "n" protected sections where n is greater than 1, the application launcher executable may access one or more of these sections in the mechanism described herein. The protected memory region may contain, for example, executable software (also called an application executable), or installable software (also called an application installable), or protected data.

Figure 8:
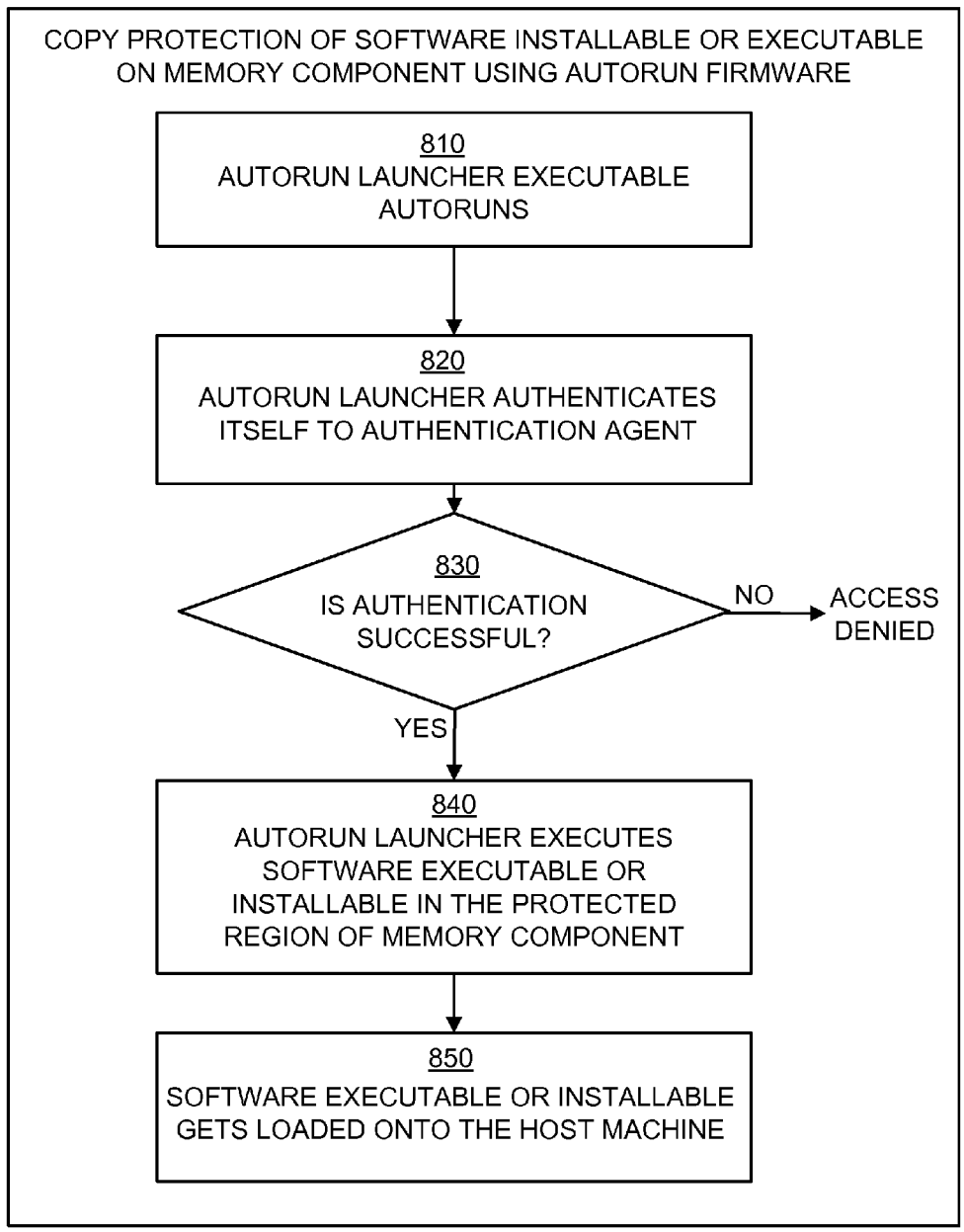
FIG. 8 is a flow diagram of a software-implemented copy protection method.

FIG. 8 is a flow diagram of a software-implemented copy protection method for protecting of software that is executable or installable on using autorun firmware.

In step 810, an application launcher executable that is stored in a memory component of an IC memory device is run automatically on a host computer by an autorun firmware stored on the IC memory device. The autorun firmware is operates automatically upon activation of the IC memory device, such as occurs when the memory device is plugged into a port or socket of the host computer.

In step 820, the application launcher authenticates itself to authentication agent software that resides in the protected region of the memory component. The authentication agent software may be incorporated within the software executable or installable that is being protected or may be a separate application. The authentication algorithm may be password based or may involve cryptographic techniques.

Step 830 is a query whether the authentication is successful. If not, access to the protected executable or installable is denied. If authentication is successful, step 830 proceeds to step 840 and the application launcher executable gains access, to the protected memory region.

In step 840, the application launcher executable executes the application executable or installable that is stored in the protected region of the memory component. The application launcher executable may also be programmed to execute any or all executables and installables that exist within the protected region of the memory component.

In step 850, the executables and installables thus launched are executed on the host computer.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An integrated circuit memory device connectable to a host computing device by a user for running computing software on the host computing device and not providing means for the user to run at least part of the computing software without connecting the integrated circuit memory device to the host computing device, and for providing copy protection of at least part of the computing software associated with services provided by the computing software, the integrated circuit memory device comprising:

a controller for controlling interaction between the integrated circuit memory device and the host computing device;

a memory component storing at least part of the computing software operable on the host computing device, the memory component including a protected or private memory component storing private data, the private data being associated at least partly with the computing software for running on the host computing device, the private data stored in the protected memory component is not implemented to be accessible or viewable by the user of the integrated circuit memory device from the protected memory component, and the protected memory component is implemented to prevent the private data stored in the private memory component from being copied by the user from the protected memory component, and at least part of the private data stored in the protected memory component being permitted to be executed on the host computing device upon connection and activation of the integrated circuit memory device on the host computing device;

firmware embedded in the integrated circuit memory device having:
  means to facilitate interaction between the integrated circuit memory device and the host computing device,
  means to facilitate access of the protected memory component of the integrated circuit memory device,
  means to facilitate the integrated circuit memory device identifying itself with the host computing device in accordance with a first device interface description, and
  means to facilitate the integrated circuit memory device for identifying itself to the host computing device with a second device interface description subsequent to identifying itself with the host computing device with a first device interface description; and autorun software stored at least partly on the integrated circuit memory device for auto running, at least partly, on the host computing device upon connection of the integrated circuit memory device to the host computing device, the autorun software, when executed, providing:
  means to load from the protected memory component the private data associated with the computing software by interacting with the firmware embedded in the integrated circuit memory device, and
  means to facilitate running at least part of the computing software on the host computing device that includes the private data access from the protected memory component subsequent to connection and activation of the integrated circuit memory device to the host computing device.

2. The integrated circuit memory device of claim 1, further comprising a wireless component for adding a wireless interface to the host computing device with the wireless component, and the computing software running on the host computing device relating at least partly to wireless software for running on the host computing device.

3. The integrated circuit memory device of claim 2, in which the wireless component conforms at least partly to one or more of a Bluetooth, a WiFi, a ZigBee, and an IrDa standard of wireless communication, individually or in any combination.

4. The integrated circuit memory device of claim 1, in which the means to load from the protected memory component the private data by the autorun software includes authentication for accessing the protected memory component.

5. The integrated circuit memory device of claim 4, in which authentication includes one or more of a password, a unique identifier, a Bluetooth address, and a MAC address, individually, or in any combination.

6. The integrated circuit memory device of claim 1, further comprising a USB (Universal Serial Bus) device interface connectable to the host computing device.

7. The integrated circuit memory device of claim 1 being at least one of a USB (Universal Serial Bus) device, a USB flash drive, a SD (secure digital) device, and a wireless adapter device, individually, or in any combination.

8. The integrated circuit memory device of claim 1, in which the memory component further includes a public memory section, and the content stored in the public memory section can be viewed and accessed by a user.

9. The integrated circuit memory device of claim 8, in which at least part of the computing software is stored in the public memory section of the memory component.

10. An autorun method for running on a host computing device selected software or data using an integrated circuit memory device that is connectable by a user to an external port of the host computing device, the integrated circuit memory device including:
  a memory component storing at least part of selected software or data operable on the host computing device, and
  a controller for controlling interaction between the integrated circuit memory device and the host computing device, the controller including firmware to support loading of at least part of the selected software or data from the memory component of the integrated circuit memory device for running on the host computing device, the method comprising:

activating the integrated circuit memory device upon connection of the integrated circuit memory device to the host computing device;

informing the host computing device of the presence of autorun software on the integrated circuit memory device;

executing, automatically, at least part of the autorun software on the host computing device, the autorun software running on the host computing device interacting with the firmware included in the integrated circuit memory device for accessing at least part of the selected software or data stored in the memory component of the integrated circuit memory device;

loading, by the autorun software, at least part of the selected software or data stored in the memory component of the integrated circuit memory device;

facilitating running, by the autorun software, at least part of the selected software or data loaded from the memory component of the integrated circuit memory device on the host computing device;

identifying the integrated circuit memory device to the host computing device in accordance with a first device interface description; and determining whether the integrated circuit memory device is to be re-enumerated, and in dependence to a positive determination:

re-enumerating the integrated circuit memory device for identifying the integrated circuit memory device to the host computing with a second device interface description.

11. The method of claim 10, further comprising a wireless component for adding a wireless interface to the host computing device.

12. The method of claim 10 in which the first device interface description identifies the integrated circuit memory device in a manner analogous to that of a CD-ROM drive or a mass storage class device.

13. The method of claim 10, in which the integrated circuit memory device includes a public memory section where at least part of the selected software or data operable on the host computer is stored, the content of the public memory section being viewable and accessible by the user.

14. The method of claim 10, further comprising providing the integrated circuit memory device with a user operable manual switch that allows a user to switch from among two or more operating states.

15. In a computer readable memory or non-transitory storage medium, autorun software stored at least partly in an integrated circuit memory device connectable by a user to an external port of a host computing device to facilitate running on the host computing device protected software or data that can be executed by the host computing device using the integrated circuit memory device, and at least part of the protected software or data is not implemented to be copied by said user from a protected memory component of the integrated circuit memory device, the medium comprising:
- software for automatically running on the host computing device at least part of autorun software upon connection of the integrated circuit memory device to the host computing device;
- software for identifying the integrated circuit memory device to the host computer with a first device interface description;
- software for interacting with firmware embedded in the integrated circuit memory device for accessing the protected memory component in the integrated circuit memory device, at least part of the protected software or data stored in the protected memory component is not implemented to be accessible or viewable by the user from the protected memory component but is implemented to be accessible by the autorun software upon connection and activation of the integrated circuit memory device to the host computing device;
- software for loading at least part of the protected software or data from the protected memory component of the integrated circuit memory device;
- software for running and executing at least part of the protected software or data by the autorun software on the host computer;
- software for querying or determining whether the integrated circuit memory device is to be re-enumerated; and
- software for re-enumerating the integrated circuit memory device to the host computer with a second device interface description such that the integrated circuit memory device operates with the host computer in accordance with the second device interface description.

16. The medium of claim 15, in which loading at least part of the protected software or data on the host computer from the protected memory component includes authenticating the autorun software with a security feature included in the Integrated circuit memory device.

17. The medium of claim 15, further comprising a non-protected or public memory section, the content of which is implemented to be viewable and accessible by the user.

18. The medium of claim 17, in which at least part of the protected software or data is stored in the non-protected or public memory section, and the medium further comprising software for loading at least part of the protected software or data on the host computer from the non-protected or public memory section of the Integrated circuit memory device.

19. The medium of claim 15, further comprising software for determining an operating state from among plural operating states based on an user operable manual switch.

20. The medium of claim 15, in which the protected software or data is related to one or more services that include wireless communication, file transfer, file sharing, digital content output, phone calling, Internet access, individually or in any combination, running or provided on or via the host computing device.

21. An integrated circuit microcontroller in a memory device for controlling the memory device, the memory device connectable by a user to a host computing device for running at least part of an application launcher on the host computing device, at least part of the application launcher being stored in the memory device, the integrated circuit microcontroller comprising:
- at least one upstream interface for interfacing or connecting with the host computing device and at least one downstream interface for connecting to external memory;
- a microprocessor;
- a memory component that includes a protected or private memory component storing at least part of protected data, the protected data being associated with a computing software for running on the host computing device, at least part of the protected data stored in the protected memory component is not implemented to be accessible or viewable by the user of the memory device from the protected memory component, and at least part of the protected data stored in the protected memory component is not implemented to be copied by the user from the protected memory component, and the protected data stored in the protected memory component can be executed by the user upon connection and activation of the memory device on the host computing device; and
- firmware executable by the microprocessor, the firmware having:
- means to facilitate interaction between the memory device and the host computing device,
- means to interact with the application launcher that runs on the host computing device,
- means to access the protected memory component of the memory device, and
- means to enable the application launcher access to at least part of the protected data for enabling execution of the computing software on the host computing device.

22. The integrated circuit microcontroller of claim 21 in which the firmware further has:
- means to facilitate the memory device identifying itself to the host computing device in accordance with a first device interface description, and
- means to facilitate the memory device identifying itself to the host computing device in accordance with a second device interface description.

23. The integrated circuit microcontroller of claim 21 further including a wireless component providing a wireless interface to the host computing device for one or more of wireless communication, Internet access, file transfer, file sharing, and content rendering, individually or in any combination.

* * * * *